Patented July 6, 1954

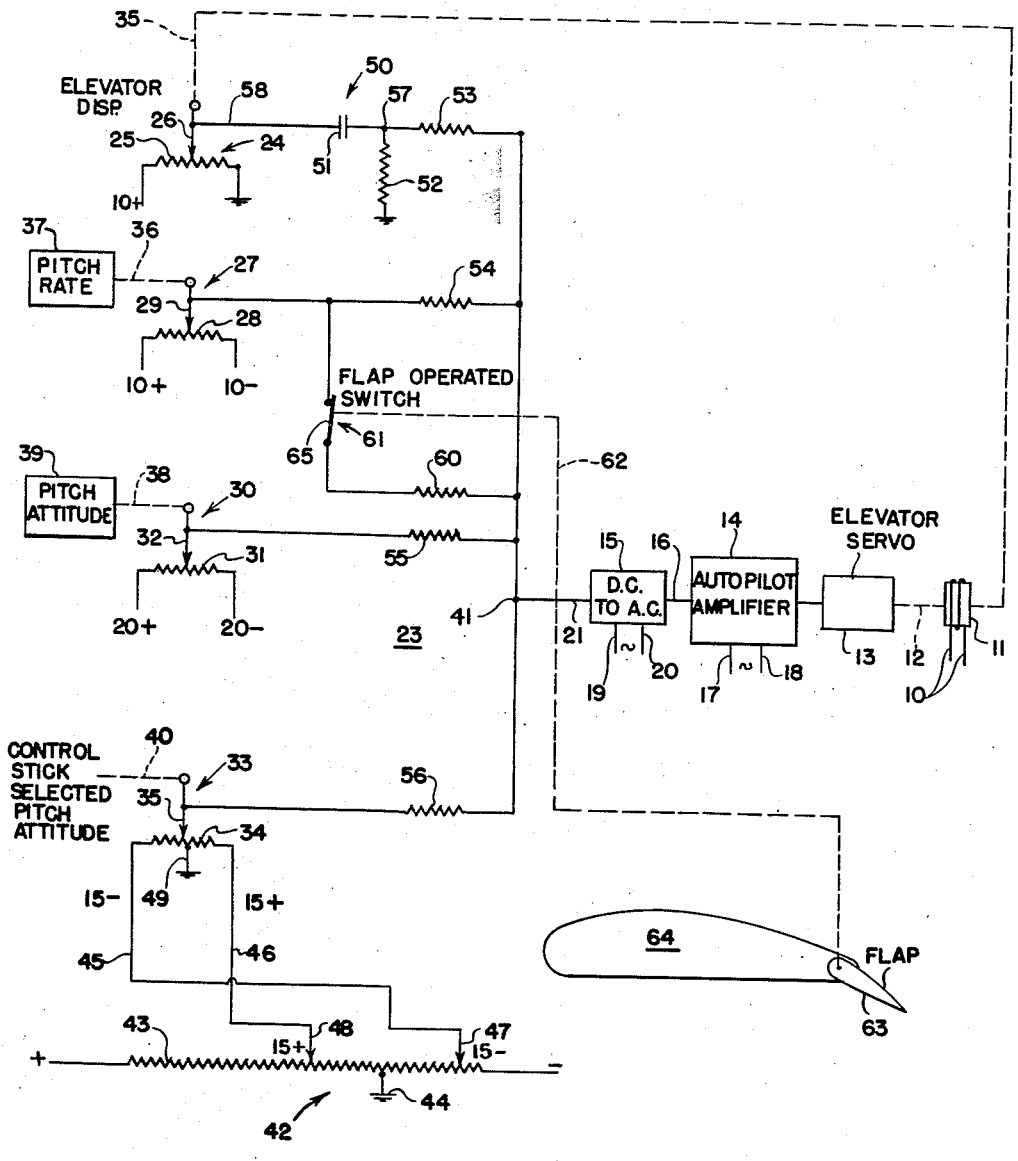

2,683,004

UNITED STATES PATENT OFFICE 2,683,004

AUTOMATIC PILOT

Ross C. Alderson, St. Louis Park, and Homer D. Eckhardt, Minneapolis, Minn., assignors to Minneapolis-Honeywell Regulator Company, Minneapolis, Minn., a corporation of Delaware Application December 17, 1951, Serial No. 262,041

6 Claims. (Cl. 244—77)

This invention relates to automatic pilots for an airplane wherein such airplane is provided with flaps which are lowered during the landing operation of said airplane. Such flaps, when in operated position alter the physical configuration of the craft. The operated flaps increase the effective angle of incidence of the wings of the craft and also increase its drag to lower the air speed to assist in landing the craft.

It will be appreciated that an airplane in flight has rotational inertia that resists a change in attitude of the airplane, for example, about the pitch axis thereof. This airplane also has conventionally a horizontal stabilizer that also opposes the rotation of the craft. Its damping effect depends on the air speed of the craft.

When the aircraft is provided with an automatic pilot that includes a device that detects changes in pitch attitude, it displaces the elevator control surface to further oppose such change. The air stream impinging on the deflected surface develops a force on the surface tending to restore the craft to its original attitude.

When the craft being thus restored has regained momentarily its original attitude, the elevator is normally in unoperated position, but the momentum of the craft would carry it beyond the original attitude despite the opposition stated of the horizontal stabilizer. The craft would then experience a series of oscillations about the original attitude which would be damped out by the stabilizer.

In some automatic pilots, a rate of pitch responsive device is included which tends to supply a control effect somewhat in advance of the attitude detecting device in the automatic pilot. This rate of pitch responsive device aids the attitude detecting device during departure of the airplane from the original attitude but opposes it during movement of the airplane from maximum deflection toward original attitude.

The rate of pitch device in the automatic pilot tends to apply opposite elevator as the craft moves toward its normal attitude and thus opposes the inertia or momentum of the craft. The rate device in effect opposes overshoot of the craft beyond its original attitude, and thus has a damping effect.

It is an object of this invention to increase the damping effect of the automatic pilot on the airplane when the wing flaps of the airplane provided with such automatic pilot are in operated position wherein they increase the effective angle of incidence and decrease the air speed of such airplane.

It is a further object of this invention to increase the damping effect of an airplane's elevator control surface on the rotation of such airplane while the flaps of such airplane are in operated position.

It is a further object of this invention to increase the effect of a rate of turn device of an airplane's automatic pilot on the rotation of an airplane about the pitch axis thereof while the flaps of such airplane are in operated position.

The above and other objects of the invention will appear hereinafter upon consideration of the following description in conjunction with the accompanying drawing disclosing one embodiment of said invention.

Automatic pilots for an airplane have been heretofore provided which stabilize the aircraft about its pitch axis. The magnitude of deviation of such aircraft about its pitch axis from a normal position has been detected by a vertical gyroscope which provides a control effect proportional to the magnitude of the displacement from the normal position. Such apparatus has also included a rate of pitch device such as a pitch rate gyroscope which provides an effect in the apparatus proportional to the rate of change of pitch of the aircraft. The elevator control surface is operated in accordance with the displacement and rate of change of displacement of the aircraft. The relative amount of elevator control surface displacement to the vertical gyroscope displacement is conventionally understood to determine the pitch attitude "stiffness" of the automatic pilot. On the other hand, the amount of elevator displacement for a pitch rate gyroscope response determines the damping effect of the automatic apparatus on oscillations of the aircraft about its pitch axis. For a given air speed, we may increase the damping effect of the automatic apparatus on the oscillations of the aircraft by increasing the effect of a given response of the rate gyroscope on the automatic apparatus.

The apparatus comprises a servo-motor for operating the elevator of the aircraft with the motor being reversibly controlled from an A. C. discriminator amplifier. The amplifier has supplied thereto alternating control signals from a vibrator to which in turn are applied direct voltage signals from a balanceable network. The network comprises a plurality of voltage generators which may be separately responsive to the pitch attitude and rate of change of pitch attitude of the aircraft. The rate of pitch attitude voltage generator has its effect increased on the balanceable network as a flap located in the wing of the aircraft is moved toward its open position wherein it decreases the air speed of the aircraft.

For an understanding of the details whereby the objects of the invention are attained reference is made to the following detailed description and accompanying drawing, the sole figure of which is a schematic arrangement of a pitch channel of an automatic pilot.

Referring to the drawing, an elevator control surface (not shown) of the aircraft is operated by conventional cables 10 extending from a cable drum 11 carried by an output shaft 12 of an elevator servo-motor 13. The elevator servo-motor is reversely controlled from an autopilot amplifier 14. The autopilot amplifier is of the A. C. discriminator type and effects the alternative operation of either of two relays therein depending upon the phase relationship of an alternating voltage signal with respect to an alternating voltage from a supply line. The relays in turn alternatively effect control of the direction of rotation of a reversible servo-motor. The amplifier motor combination may be such as is disclosed in Patent 2,425,734 dated August 19, 1947, to Willis H. Gille et al.

Control signals for the amplifier 14 are supplied thereto through a multiple conductor 16 from a D. C. to A. C. converter 15. A. C. power is supplied to amplifier 14 through conductors 17 and 18 connected to an alternating voltage source. The phase relationship of the control voltage from the conductor 16 with respect to the voltage across supply conductors 17, 18 determines the direction of rotation of the elevator servo-motor 13. The D. C. to A. C. converter 15 may be a conventional vibrator having an operating coil connected by conductors 19 and 20 to the source of A. C. voltage. Conductor 21 extends from the vibrator 15 to a balanceable network 23 which is the source of D. C. control voltage signals.

The balanceable network 23 comprises an elevator displacement signal generator 24, a rate of change of pitch attitude signal generator 27, a pitch attitude signal generator 30, and a manually operable selected pitch attitude signal generator 33. Signal generator 24 comprises a potentiometer having a resistor 25 and a slider 26 cooperable therewith. Slider 26 is moved along resistor 25 in accordance with the extent of operation of elevator servo-motor 13 by a follow-up operating connection 35. Signal generator 27 comprises a potentiometer having a resistor 28 and a slider 29. Slider 29 is positioned along resistor 28 by an operating connection 36 extending from a pitch rate responsive device 37. The pitch rate responsive device 37 may be a rate gyroscope of a type (well known in the art) for detecting the rate of turn of an aircraft. Such a gyroscope has a rotor with two axes of angular freedom with its precession about one axis opposed by restraining means so that extent of precession is in accordance with the rate of pitch attitude change of the aircraft.

Signal generator 30 comprises a potentiometer having a resistor 31 and slider 32. Slider 32 is positioned along resistor 31 by a suitable operating connection 38 extending from a pitch attitude responsive device 39. The pitch attitude responsive device 39 may be a conventional vertical gyroscope whose rotor spin axis is perpendicular to the surface of the earth. The rotor is supported on its spin axis in a casing which casing in turn is carried in cross gimbals for rotation about two respectively perpendicular horizontal axes. Signal generator 33 comprises a potentiometer having a resistor 34 and slider 35. Slider 35 is manually adjusted along resistor 34 by a manually operable means 40 connected thereto.

The voltage for energizing the various potentiometer resistors is obtained from a D. C. voltage source 42. The voltage source 42 may comprise a potentiometer whose resistor is connected across a suitable source of direct voltage to form a voltage divider. The resistor 43 includes a ground tap 44. The connections from the resistor 34 of potentiometer 33 to the voltage dividing resistor 43 only have been illustrated. Conductors 45 and 46 extending from the opposed ends of resistor 34 of potentiometer 33 are connected respectively to adjustable taps 47 and 48 bearing on resistor 43. Taps 47 and 48 may be adjusted relative to the ground tap 44 to select desirable positive and negative D. C. voltages relative to the voltage of the ground tap 44. The resistors of the remaining potentiometers may be similarly connected to the voltage dividing resistor 43 of the D. C. supply 42. The value of the voltages for the various ends of the potentiometer resistors relative to the voltage of the ground tap 44 are indicated adjacent thereto. The voltage of each slider in the various potentiometers relative to the voltage of the ground tap 44 depends upon the relative adjustment of such slider along its resistor.

The voltage on slider 26 in signal generator 24 is applied across a derivative network 50 consisting of a capacitor 51 and a resistor 52. To this end, a conductor 58 extends from slider 26 to one side of capacitor 51 whose opposite side is connected to one end of resistor 52 the opposite end of resistor 52 being connected to ground. The voltage between the ground end of resistor 52 and junction 57 of the capacitor 51 and resistor 52 depends upon the rate of movement of slider 26 and thus the rate of movement of the elevator servo-motor shaft 12. The voltage at junction 57 is applied through a summing resistor 53 to a network summing point 41.

The voltage on slider 29 of signal generator 27 is applied through a summing resistor 54 to the summing point 41 of network 23.

Similarly the voltages on sliders 32 and 35 are applied through their respective summing resistors 55 and 56 to the network summing point 41. From network summing point 41 the combined voltages are applied as stated through conductor 21 to the vibrator 15.

To increase the effect of the voltage from the aircraft pitch rate signal generator 27 in the balanceable network 23 there is provided a second summing resistor 60 which may be placed in parallel with summing resistor 54. This parallel arrangement of the two resistors 54 and 60 is effected by a circuit closing device 61. This circuit closing device 61 may be a single pole single throw switch the arm 65 of which may be moved to circuit closing position by an operating means 62.

The operating means 62 is adjusted by movements of a conventional wing flap 63 mounted in the wing 64 of the aircraft. The arrangement is such that when the flap 63 is in approximately its half open position the switch on 63 has completed the parallel arrangement of resistors 54 and 60 so that an increased control signal in network 23 is supplied from the pitch rate signal generator 27.

In operation, when the aircraft is in conventional flight such as during cross-country flying, the pitch attitude gyroscope 39 senses any change in magnitude of the position of the aircraft about its pitch axis to supply signals from generator 30 to maintain the aircraft in a level position relative to the pitch axis. The effect of any movement of slider 32 by the pitch attitude responsive device 39 depends upon the voltage across resistor 31. The voltages selected provide the proper "stiffness" of control of the elevator so that corrections are immediately applied for change in pitch attitude.

The pitch attitude rate device 37 also adjusts its signal generator 27 to supply control signals in network 23. The signals from generator 27 reinforce the signal from generator 30 during deviations of the craft from normal pitch attitude until maximum deviation is attained. As the craft moves toward its normal position, the signal from the generator 27 is reversed, and it opposes the signal from the pitch attitude generator 30. When the craft is very near its normal position after a deviation, the signal from the pitch rate generator 27 may exceed that from the pitch attitude generator 30 and result in opposite positioning of the elevator control surface. The aircraft is subjected to an opposing torque by the oppositely positioned surface so that the craft will have a tendency to reach its normal position without oscillating beyond said position.

When the pilot of such aircraft desires to land the craft, he operates the selected pitch attitude slider 35 by the operable means 40 to introduce a proper control signal. As the craft is nosed down toward the landing field, the pilot also effects by conventional means not forming a part of this invention the lowering of the wing flaps. As wing flaps are moved toward open position, flap 63 effects the operation of switch arm 65 to place resistor 60 in parallel with resistor 54.

The current through the parallel resistors 54 and 60 is greater than through the single resistor 54 and therefore the current through the other summing resistors is decreased and the voltages altered so that the voltage supplied by the signal generator 27 in network 23 is effectively increased. Thus the gain or output of the pitch rate signal generator 27 is increased during lowering of the wing flaps of the aircraft. With this increased effect or increased gain, the rate of change of pitch attitude of the aircraft exerts a greater damping effect on the movements of the aircraft about its pitch axis and has a greater tendency to damp any such oscillation.

As the flaps are moved to unoperated position, the circuit for resistor 60 is opened at the circuit closer 61 so that normal configuration of the network 23 in automatic apparatus is restored.

In conclusion, it will now be apparent that we have provided an arrangement for improving the damping effect of flight control apparatus on oscillations of an aircraft which arrangement is operative during a change in the physical configuration of the aircraft resulting from the opening of the wing flaps thereof, to thus improve the control of the craft in flight.

We claim as our invention:

1. Control apparatus for an aircraft having an elevator control surface for positioning said craft about its pitch axis, and having wing flaps, said apparatus comprising: a motor connected to said surface and thereby adapted to position said elevator surface; balanceable voltage control means connected to said motor means including an aircraft pitch rate responsive voltage providing device, a pitch attitude responsive voltage providing device, and a follow-up voltage providing device operated from said motor; and means in said balanceable control means responsive to operation of said wing flaps for increasing solely the voltage from such pitch rate voltage providing device to said control means whereby the damping effect of said pitch rate device and control means on oscillations of said aircraft about its pitch axis is increased.

2. Control apparatus for an aircraft having an elevator control surface, for positioning said craft about its pitch axis, and having wing flaps operable to change the exterior physical configuration of said aircraft for decreasing the air speed of said aircraft, said apparatus comprising: a motor connected to said surface and thereby adapted to position said elevator surface; a balanceable control means connected to said motor means said control means including an aircraft pitch rate gyroscope operated device, a pitch attitude responsive device, and a device operated from said motor for affecting the balance of the control means proportional to their operation; and means in said control means responsive to operation of said wing flaps for increasing only the pitch rate gain of said pitch rate gyroscope in said control means for the same pitch rate of the craft whereby the damping effect of said control apparatus on oscillations of said aircraft about its pitch axis is increased by modifying the position of the elevator surface.

3. Control apparatus for an aircraft having an elevator control surface for positioning said craft about its pitch axis, and having wing flaps for altering the exterior physical configuration of the craft, said apparatus comprising: a motor adapted to position said elevator surface; automatic attitude condition responsive means for operating said motor for stabilizing said craft about its pitch axis said automatic means including a pitch attitude rate responsive device for damping oscillations of said craft about its pitch axis from a predetermined attitude; and means responsive to operation of said wing flaps for increasing only the damping effect of said device for the same pitch attitude rate whereby said automatic means exerts an increased effect against the oscillations of said craft about the pitch axis.

4. Control apparatus for an aircraft having an elevator control surface, for positioning said craft about its pitch axis, and wing flaps for changing the configuration of said aircraft for decreasing its air speed, said apparatus comprising: a motor adapted to position said elevator surface; means connected to said motor including a balanceable network for reversibly controlling said motor; a plurality of variable voltage signal generators in said network, one generator being operated by a gyroscope responsive to pitch axis attitude rate changes of said aircraft to provide a voltage proportional to craft pitch change rate; and means connected to said network and responsive to operation of said wing flaps for alone increasing the voltage of said gyroscope operated generator in said network to increase the craft oscillation damping characteristics of said apparatus; and means responsive to magnitude of change in pitch axis attitude for operating another signal generator in said network to provide a voltage proportional to craft pitch attitude change, to stabilize the attitude thereof.

5. Control apparatus for an aircraft having an elevator control surface, for positioning said craft about its pitch axis, and operable means which alter the exterior physical configuration of said aircraft, said apparatus comprising: a motor adapted to position said elevator surface; automatic craft condition rate change responsive control means connected to said motor means to effect operation of the motor in accordance with the response of said control means for stabilizing said aircraft about its pitch axis; and means operated as said operable means are moved to operated position to alter the exterior physical configuration for varying alone the effect of said automatic control means on said motor during said condition rate change to modify the position of said elevator control surface.

6. Control apparatus for an aircraft having an elevator control surface, for positioning said craft about its pitch axis, and operable wing flaps for altering the physical configuration of said aircraft for decreasing its air speed, said apparatus comprising: an electric motor adapted to position said elevator surface; balanceable electrical automatic control means connected to the motor and including further means for providing an electrical input signal proportional to the rate of turn of the craft about the pitch axis for controlling said motor means; followup means in said automatic control means operated by said motor for producing a control signal opposing the input signal to terminate motor operation and thereby stabilizing said aircraft about its pitch axis; and means in said control means operated as said wing flaps are moved to operated position for alone increasing the effect of said further means in said automatic means by increasing the electrical signal therefrom to cause said motor to modify the position of said elevator control surface.

References Cited in the file of this patent

UNITED STATES PATENTS

| Number | Name | Date |
|---|---|---|
| 2,175,584 | Zand | Oct. 10, 1939 |
| 2,228,311 | Gwinn, Jr. | Jan. 14, 1941 |
| 2,401,168 | Kronenberger | May 28, 1946 |
| 2,416,097 | Hansen, Jr., et al. | Feb. 18, 1947 |
| 2,464,629 | Young | Mar. 15, 1949 |
| 2,488,286 | Glenny | Nov. 15, 1949 |
| 2,503,346 | Meredith | Apr. 11, 1950 |
| 2,597,077 | Douglas | May 20, 1952 |